United States Patent
Deeg et al.

(10) Patent No.: US 7,814,750 B2
(45) Date of Patent: Oct. 19, 2010

(54) DEVICE FOR SUPPLYING PRESSURE TO A PISTON ACTUATOR

(75) Inventors: Markus Deeg, Eberdingen (DE); Friedbert Roether, Cleebronn (DE); Mario Steinborn, Friedrichshafen (DE); Rainer Petzold, Friedrichshafen (DE)

(73) Assignees: KNORR-BREMSE Systeme fuer Nutzfahzeuge GmbH, Munich (DE); ZF Friedrichshafen AG, Friedrichshafen (DE)

(*) Notice: Subject to any disclaimer, the term of this patent is extended or adjusted under 35 U.S.C. 154(b) by 578 days.

(21) Appl. No.: 11/798,616

(22) Filed: May 15, 2007

(65) Prior Publication Data
US 2007/0272047 A1   Nov. 29, 2007

Related U.S. Application Data

(63) Continuation of application No. PCT/EP2005/012231, filed on Nov. 15, 2005.

(30) Foreign Application Priority Data
Nov. 15, 2004   (DE) ............. 10 2004 055 030

(51) Int. Cl.
*F16H 61/06* (2006.01)
*F15B 11/02* (2006.01)

(52) U.S. Cl. .................. 60/407; 91/461; 74/335
(58) Field of Classification Search .......... 60/407, 60/409, 413, 417, 422, 403; 74/335, 473.11; 91/461; 137/102
See application file for complete search history.

(56) References Cited

U.S. PATENT DOCUMENTS

| | | | | |
|---|---|---|---|---|
| 4,875,892 | A | * | 10/1989 | Sueda ........................ 474/17 |
| 5,836,207 | A | * | 11/1998 | Spooner et al. ............... 74/335 |
| 6,584,999 | B2 | * | 7/2003 | Inayama et al. .......... 137/487.5 |
| 6,705,175 | B1 | | 3/2004 | Klatt |
| 2001/0009881 | A1 | | 7/2001 | Albs et al. |
| 2004/0014564 | A1 | | 1/2004 | Jager et al. |

FOREIGN PATENT DOCUMENTS

| | | |
|---|---|---|
| DE | 33 15 221 A1 | 10/1984 |
| DE | 100 02 693 A1 | 7/2001 |
| DE | 102 49 341 A1 | 5/2004 |
| EP | 0 417 275 A1 | 3/1991 |
| EP | 1 067 319 B1 | 1/2001 |
| WO | WO 2004/113767 A1 | 12/2004 |
| WO | WO 2005/103530 A2 | 11/2005 |

OTHER PUBLICATIONS

International Search Report dated Jan. 19, 2006 including English translation (Six (6) pages).

* cited by examiner

*Primary Examiner*—Thomas E Lazo
(74) *Attorney, Agent, or Firm*—Crowell & Moring LLP

(57) ABSTRACT

A device for supplying pressure from an energy storage device to a piston gear shifting actuator by way of a valve device is provided. A pressure regulating and/or control device is used to regulate and/or control the pressure applied to the piston actuator. The pressure regulating and/or control device regulates and/or controls the pressure according to at least one following quantity: temperature, in particular a transmission operating temperature, the load state of the motor vehicle provided with the transmission, and the slope of a surface along which the motor vehicle provided with the transmission runs.

6 Claims, 1 Drawing Sheet

DEVICE FOR SUPPLYING PRESSURE TO A PISTON ACTUATOR

CROSS-REFERENCE TO RELATED APPLICATIONS

This application is a continuation of PCT International Application No. PCT/EP2005/012231, filed on Nov. 15, 2005, which claims priority under 35 U.S.C. §119 to German Application No. 10 2004 055 030.1, filed Nov. 15, 2004, the entire disclosures of which are expressly incorporated by reference herein.

BACKGROUND AND SUMMARY OF THE INVENTION

The present invention relates to a device for supplying pressure to a piston actuator, which is provided for carrying out transmission shift functions. Pressure originating from an energy accumulator is supplied to the piston actuator via a valve device. A pressure regulating and/or control device is provided, by which the pressure with which the piston actuator is supplied can be regulated and/or controlled.

Devices are generally known, for example, from DE 102 49 341 DE and EP 1 067 319 B1. In DE 102 49 341 DE, in which the pressure regulation or control takes place as a function of stored control and/or regulating functions. According to EP 1 067 319 B1, it is additionally possible to incorporate the present position of the piston into the regulation or control.

It is possible, by way of the pressure regulation or control as a function of transmission parameters, to adapt the force used to actuate the actuating elements of the transmission to the present operating state of the transmission, and thereby to avoid an increased mechanical loading.

In the transmission actuator concept known from DE 33 15 221 C2, the actuation of the piston adjuster takes place, in contrast, with a constant pressure, which is extracted from a compressed air reservoir. Actuating elements provided in the transmission are correspondingly moved with the force resulting from the constant pressure. Here, the pressure held in the reservoir must be selected such that a gearshift can reliably take place even under extreme operating states, for example at very low temperatures. If there are no extreme operating states present in which the actuating elements of the transmission must be moved with a high force, the constant pressure leads to an increased mechanical loading of the actuating elements of the transmission, which can, in particular, include shift forks and stops, and therefore lead to increased wear.

Although the pressure regulation or control as a function of transmission parameters, as explained in the introduction, reduces wear considerably, it is still possible overall for operating states to occur which lead to higher wear than would be necessary.

The present invention is, therefore, based on the object of developing a devices and method such that mechanical loading of the actuating elements of the transmission is reduced to the minimum required level.

This, and other, objects are achieved by a device for supplying a piston actuator, which is provided for carrying out transmission shift functions, with pressure originating from an energy accumulator and supplied to the piston actuator via a valve device. A pressure regulating and/or control device is provided, by which the pressure with which the piston actuator is supplied can be regulated and/or controlled. The pressure regulating and/or control device regulates and/or controls the pressure as a function of at least one of the following variables: (a) temperature, in particular the operating temperature of the transmission; (b) loading state of a motor vehicle to which the transmission is assigned; and (c) gradient of the underlying surface on which the vehicle to which the transmission is assigned is traveling.

Advantageous embodiments and refinements of the invention are described herein.

The device according to the invention provides a pressure regulating and/or control device that regulates and/or controls the pressure as a function of at least one of the following variables:

- temperature, in particular the operating temperature of the transmission,
- loading state of a motor vehicle to which the transmission is assigned, and
- gradient of the underlying surface on which the vehicle to which the transmission is assigned is traveling.

The adaptation of the shift forces to at least one, though preferably to all of the variables reduces the mechanical loading of the actuating elements of the transmission to the minimum required value in the respective operating state of the overall vehicle, thereby reducing wear. It is, for example, possible for high shift forces to be selected at low temperatures and for relatively low shift forces to be selected at normal operating temperatures. It is also possible to generate higher shift forces in the case of a fully-loaded vehicle than in the case of an empty or only lightly-loaded vehicle. It can, additionally or alternatively, be advantageous to generate higher shift forces when traveling up a gradient than when traveling down a gradient.

In a preferred embodiment of the invention, it is provided that the pressure regulating and/or control device includes a relay valve. A relay valve of this type is suitable for influencing a working pressure as a function of a control pressure, which is applied to the relay valve, for example in such a way that the working pressure corresponds to the control pressure.

In this context, it is preferably also provided that the relay valve has a control inlet to which can be supplied a control pressure which is set by way of a solenoid valve device. In the control section of the system, the pressure medium volume flow rate is relatively small, so that the solenoid valve device may be of relatively small and, therefore, cost-effective design.

Here, one preferred embodiment of the invention provides that the solenoid valve device is activated by an electronic control unit. The electronic control unit can, in particular, be an already-existing control unit whose functionality has been expanded to include the actuation of the solenoid valve device.

It is also preferable for the pressure regulating and/or control device to include a pressure sensor whose output signal is supplied to the electronic control unit. Here, the pressure sensor may advantageously measure the working pressure which is set by way of the relay valve and is used to actuate the piston actuator. By use of such an arrangement, it is possible to provide a bona fide pressure regulating circuit.

In preferred embodiments of the device according to the invention, it is also provided that the pressure regulating and/or control device is provided between the energy accumulator and the valve device. With regard to other devices described in the prior art, this novel arrangement of the pressure regulating and/or control device permits the use of the invention with relatively small changes to the system.

Other objects, advantages and novel features of the present invention will become apparent from the following detailed description of the invention when considered in conjunction with the accompanying drawings.

DETAILED DESCRIPTION OF THE DRAWING

Figure 1:
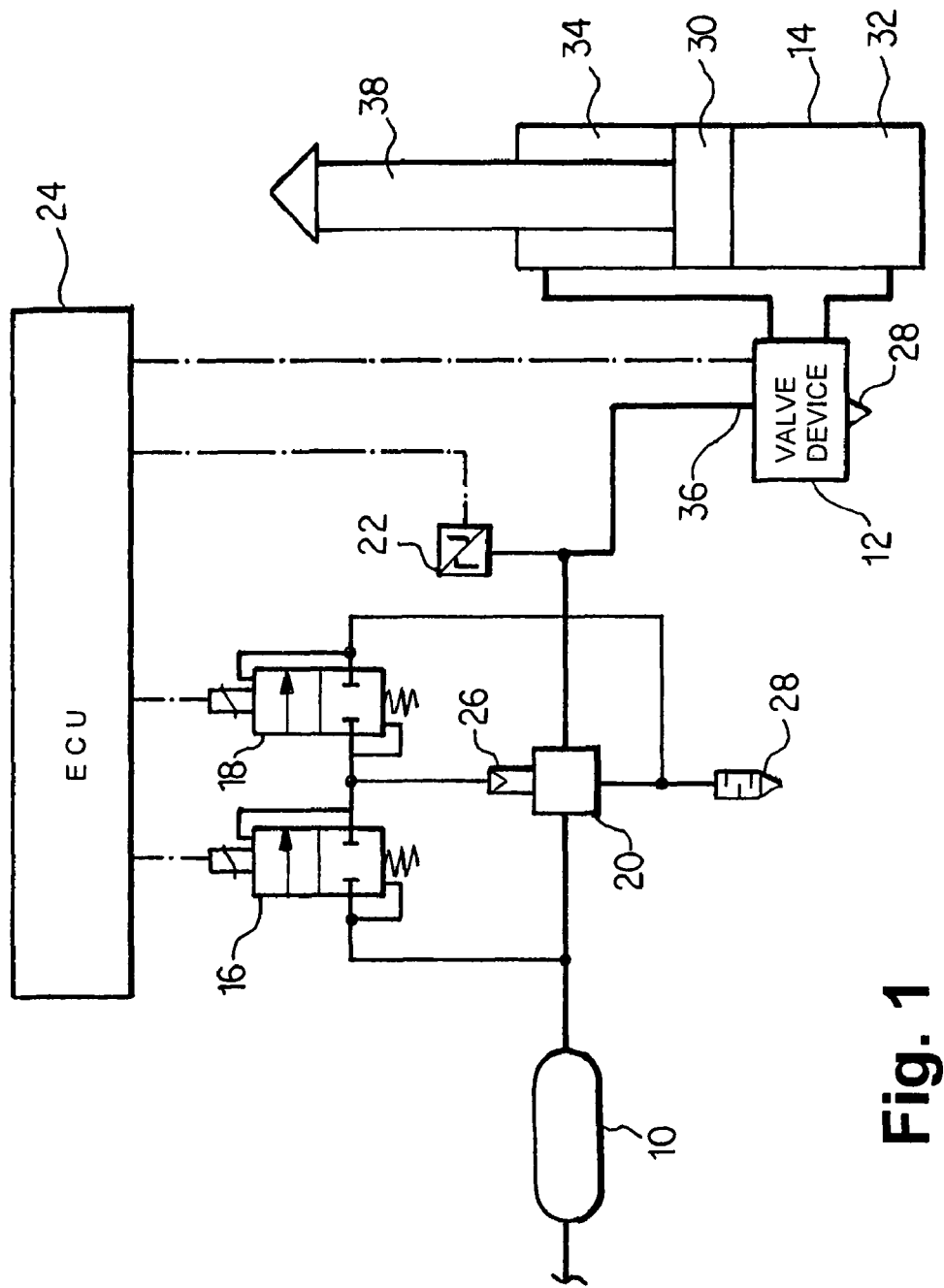
FIG. 1 is a schematic illustration of an embodiment of the device according to the invention.

Referring to FIG. 1, the illustrated device includes an energy accumulator 10 in the form of a compressed air reservoir, which is fed in a known way by a compressor (not illustrated). In order to actuate a piston actuator 14, the latter is supplied with compressed air from the energy accumulator 10 via a valve device 12. The valve device 12 is designed to connect a lower cylinder section 32 and an upper cylinder section 34 of the piston actuator 14 either to its inlet 36 or to a pressure sink 28, which can, for example, be a regeneration air tank. If, for example, the lower cylinder section 32 is connected by way of the valve device 12 to the pressure sink 28, while the upper cylinder section 34 is connected to the inlet 36 of the valve device 12, then the piston 30 and, with it, an actuating element 38 of a transmission (not illustrated) is moved downward in the context of the illustration of FIG. 1. The valve device 12 can, for example, contain 2 solenoid valves which are electrically activated in a suitable way by an electronic control unit 24, as indicated by the dash-dotted connection between the electronic control unit 24 and the valve device 12.

Provided between the energy accumulator 10 and the valve device 12 is the pressure regulating and/or control device according to the invention, with the illustration showing a pressure regulating device. The core of the pressure regulating device forms a relay valve 20, which is designed to provide a control pressure, which is applied to its control inlet 26, at the inlet 36 of the valve device 12. The level of the control pressure applied to the inlet 36 of the valve device 12 is set by way of 2 solenoid valves 16, 18, which are likewise activated by the electronic control unit 24. Here, the solenoid valve 16 forms an inlet valve and the solenoid valve 18 forms an outlet valve. It is, for example, possible for the inlet valve 16 to be activated with a pulse-width-modulated signal by the electronic control unit 24 when the outlet valve 18 is closed such that a pressure is generated at the control inlet 26 of the relay valve 20, which pressure is half as high as the pressure in the energy accumulator 10. Assuming that a pressure at a level of 10 bar is present in the energy accumulator 10, this would mean that a pressure of 5 bar would be applied both to the control inlet 26 of the relay valve 20 and to the inlet 36 of the valve device 12. Here, only an extremely small pressure medium flow rate occurs in terms of the control pressure, while the pressure medium flow rate through the valve device 12 can be considerable. Should the pressure at the control inlet 26 of the relay valve 20 be reduced, then with the inlet valve 16 closed, the outlet valve 18 is suitably activated by the electronic control unit 24 so as to open until the desired pressure is applied at the control inlet 26. Here, the control inlet 26 is connected by way of the outlet valve 18 to a pressure sink 28.

The illustrated pressure regulating device also includes a pressure sensor 22, by which the pressure at the inlet 36 of the valve device 12 is measured and can be supplied in the form of an electrical signal to the electronic control unit 24. A bona fide regulating circuit is formed in this manner.

The electronic control unit 24, is therefore, capable of regulating the level of the pressure used to actuate the piston actuator 14 as a function of operating states known to the electronic control unit in order to transmit shift forces of, in each case, suitable levels via the actuating element 38. It is, for example, possible for higher shift forces to be selected at low temperatures, in the case of a fully-loaded vehicle or when traveling up a gradient than at normal operating temperatures, in the case of an unloaded vehicle or when traveling down a gradient. In this way, the mechanical loading of the piston actuator 14, of the actuating element 38, or of further transmission components (not illustrated), may be reduced to a minimum.

Although only one piston adjuster 14 is illustrated here in FIG. 1, it is clear that, in actual embodiments, a plurality of such piston adjusters can be provided. The piston adjusters are then assigned, in each case, one valve device which corresponds to the valve device 12 and whose inlet is connected to the inlet 36, that is to say to the outlet of the relay valve 20.

TABLE OF REFERENCE SYMBOLS

10 Energy accumulator
12 Valve device
14 Piston actuator
16 Solenoid valve/inlet valve
18 Solenoid valve/outlet valve
20 Relay valve
22 Pressure sensor
24 Electronic control unit
26 Control inlet
28 Pressure sink
30 Piston
32 Lower cylinder section
34 Upper cylinder section
36 Inlet of the valve device
38 Actuating element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for supplying a piston actuator, via a valve device, with pressure originating from an energy accumulator, the piston actuator being configured to perform transmission shift functions, the device comprising:
   a pressure regulating and/or control device for regulating and/or controlling the pressure supplied to the piston actuator as a function of at least one of the following variables:
      (a) an operating temperature of a transmission;
      (b) a loading state of a vehicle having the transmission; and
      (c) a gradient of an underlying surface on which the vehicle having the transmission is traveling;
   wherein the pressure regulating and/or control device comprises a relay valve and a solenoid valve device, the relay valve having a control inlet supplied with a control pressure set via the solenoid valve device, and
   wherein the solenoid valve device comprises a first solenoid valve forming an inlet valve and a second solenoid valve forming an outlet valve.

2. The device according to claim 1, further comprising an electronic control unit for activating the solenoid valve device.

3. The device according to claim 2, wherein the pressure regulating and/or control device further comprises a pressure sensor having an output signal supplied to the electronic control unit.

4. The device according to claim 3, wherein the pressure regulating and/or control device is operably configured between the energy accumulator and the valve device.

5. The device according to claim 2, wherein the pressure regulating and/or control device is operably configured between the energy accumulator and the valve device.

6. The device according to claim 1, wherein the pressure regulating and/or control device is operably configured between the energy accumulator and the valve device.

* * * * *